Jan. 5, 1960
J. P. MATHEWS
2,919,638
AUTOMOBILE WINDOW VENTILATOR
Filed Jan. 28, 1958
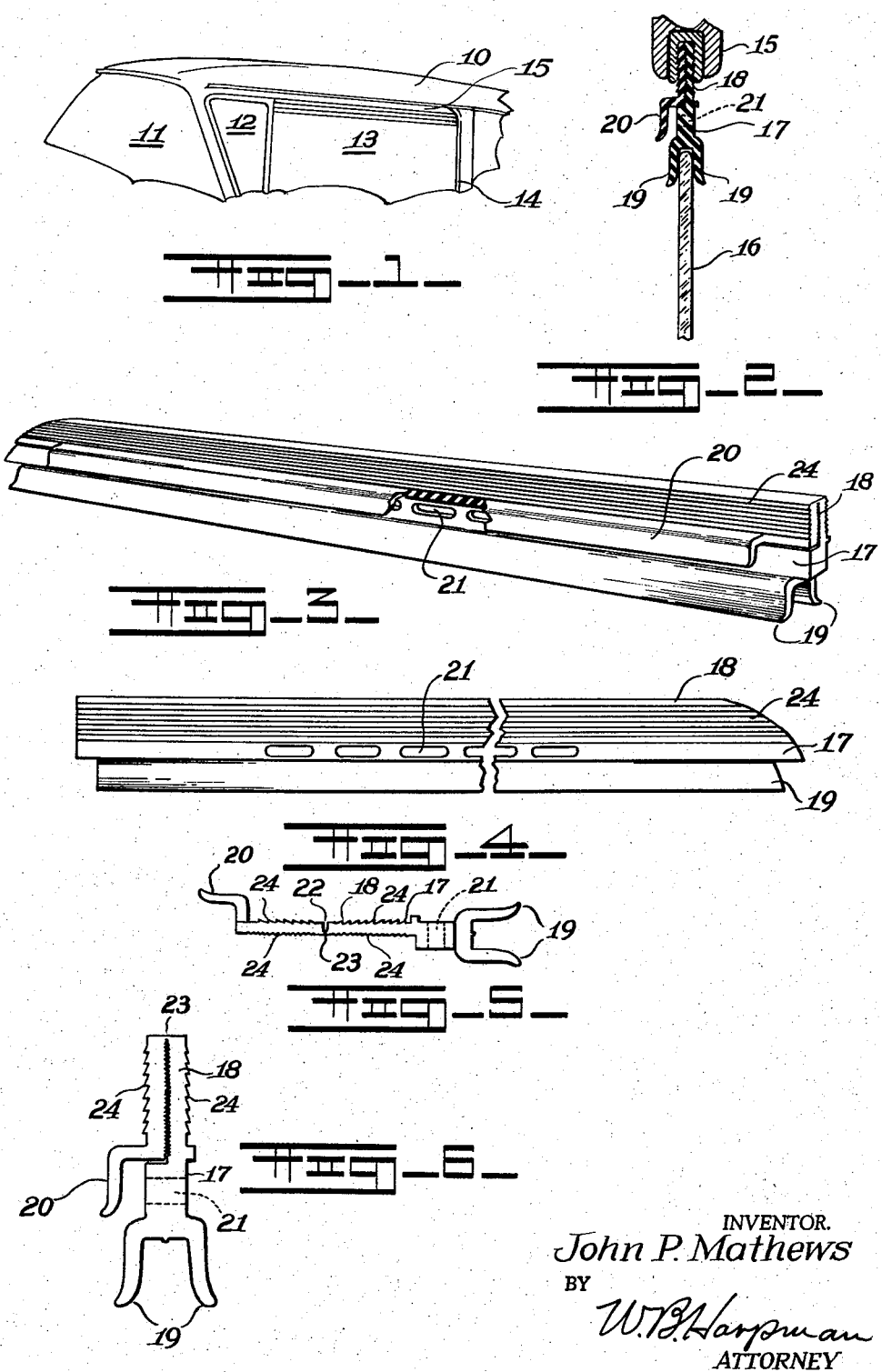
INVENTOR.
John P. Mathews
BY
ATTORNEY

2,919,638
AUTOMOBILE WINDOW VENTILATOR

John P. Mathews, Youngstown, Ohio

Application January 28, 1958, Serial No. 711,674

2 Claims. (Cl. 98—2)

This invention relates to a window ventilator for installation in the window opening of an automobile.

The principal object of the invention is the provision of a resilient ventilator strip that may be partially positioned in a glass receiving channel in an automobile window opening to provide ventilation when the glass is closed.

A further object of the invention is the provision of a window ventilator strip formed of rubber-like material that may be applied to any window opening in any standard two or four door passenger automobile.

A still further object of the invention is the provision of a resilient window ventilator which may be extruded in one piece and cut to suitable lengths making it universally adaptable to various window widths.

A still further object of the invention is the provision of a window ventilator which may be economically formed, easily installed and which acts to provide weatherproof, controlled ventilation in an automobile while the windows are closed.

The ventilator shown and described herein comprises an improvement in the art in that a simple extrudable shape is disclosed which, when extruded of rubber-like material, possesses desirable resilience which in turn imparts the characteristic of adaptability, ready-fit and self-retention to the ventilator strip formed thereby.

Ventilators for automobile windows such as heretofore known in the art have been formed of rigid materials and have of necessity included fastening means for securing them in position in the upper portion of the window opening and, by their nature, requiring an individual design and shape for each automobile body and/or window opening to be fitted. As a result, such devices have never succeeded commercially primarily for the economic reason that it is impractical to manufacture a dozen different sizes and shapes and it is even more impractical to attempt to maintain dealer stocks of such a wide variation in sizes as would be necessary.

The window ventilator disclosed herein is so designed that it is extruded of rubber-like material in a single section, a portion of which section is then doubled backwardly upon itself to form a body member which becomes self-retaining when inserted into the glass receiving channel in the top of the automobile window opening due to the external configuration and the fact that the doubled section of resilient material tends to expand and thereby exerts tension on the window receiving channel sufficiently to hold the ventilator in place.

Additionally, the ventilator disclosed herein provides a channel along its lower edge which, being formed of resilient material the same as the remainder of the ventilator, easily adjusts to the particular shape, positioning and thickness of the window glass and the same is moved upwardly into the channel when the window is closed.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a perspective view of a portion of an automobile showing the ventilator installed in the window opening thereof.

Figure 2 is a vertical section through a portion of an automobile door and window glass showing the ventilator installed therebetween.

Figure 3 is a perspective view of the outside of the ventilator with parts broken away and parts in section.

Figure 4 is a side view of the inside of the ventilator.

Figure 5 is an end view of the ventilator strip in extruded form.

Figure 6 is an end view on an enlarged scale of the ventilator strip in assembled form.

By referring to the drawing and Figures 1 and 2 in particular, it will be seen that a portion of an automobile body, including a roof 10, windshield 11 and a vent window 12, are disclosed. The vent window 12 and an adjacent window opening 13 are formed in the upper portion of the automobile door 14, as known in the art.

The upper edge of the automobile door 14 includes a longitudinally extending inverted channel 15, and a window glass 16 is mounted in the door for vertical movement, as is known in the art.

By referring now to Figures 2, 3 and 4 of the drawing a window ventilator comprising a longitudinal body member 17 may be seen with its uppermost portion 18 installed in the channel 15 of the automobile door and its lower edge being bifurcated and forming a pair of spaced downturned flanges 19—19. The ventilator body member 17 has a longitudinally extending, outwardly and downwardly positioned flange 20 on its outermost side and the body member 17 is provided with a plurality of openings 21—21 transversely thereof and positioned so that they are located up and under the outwardly and downwardly extending flange 20.

Still referring to Figures 2, 3 and 4 of the drawing it will be observed that the outwardly and downwardly extending flange 20 is on the outside of the ventilator and that the right end of the ventilator, shown in Figure 3 of the drawing, is cut vertically with the flanges 19 cut inwardly from the end a short distance, and the outwardly and downwardly extending flange 20 cut inwardly of the end a greater distance. This permits this end to be moved into contact with the vertical post which defines the back edge of the movable vent window 12, heretofore referred to.

The opposite or left end of the ventilator, as shown in Figure 3 of the drawing, is similarly formed with respect to the flanges 19 and 20 and with the end of the body member 17 being cut on a radius which extends upwardly through the uppermost portion 18. This configuration permits this end to be positioned in the normally curved upper rear corner of the window opening in the door 14.

In Figure 4 of the drawing the view comprises a plan view of the inside of the ventilator and the curved end is reversed and is seen at the right.

In Figure 5 of the drawing the ventilator is seen in "as extruded" shape, it being observed that the portion 18, which is the upper portion of the ventilator when it is moved into assembled position, is actually formed of a relatively long, narrow section having a deep, longitudinally extending groove 22 therein which leaves a small hinge section 23 so that when the outermost portion carrying the longitudinally extending flange 20 is bent downwardly to the position illustrated in Figures 2 and 6 of the drawing, the upper portion 18 of the body member 17 is formed. It will be observed that it is provided with longitudinally extending, barb-like serrations 24—24 on each of its outer sides as well as on each of its inner sides so that the serrations 24—24 on the inner sides engage one another and hold the assembled shape while the serrations 24—24 on the outsides engage the channel 15 and hold the device in the channel 15.

It will thus be seen that by forming the window ventilator from a resilient rubber-like material, a device meeting the several objects of the invention is produced and the configuration of the ventilator becomes responsible for maintaining the assembled shape and at the same time holding the device in the channel 15 at such time as the window glass 16 is moved downwardly as in opening the window.

The formation of the device from resilient material in an extruded shape renders the device universally adaptable to various widths of window openings as the same can be readily cut to fit a particular window opening and easily installed therein.

Having thus described my invention, what I claim is:

1. A ventilator adapted to be positioned in a horizontal inverted channel in an automobile window opening so as to be self-retaining therein and comprising a longitudinally extending body member of rubber-like resilient material, the upper half of which comprises a relatively thin flange having an uppermost end portion offset sidewardly and upwardly, sharp edged longitudinally extending serrations formed on one side of said thin flange, a longitudinally extending groove in the side opposite the serrations in said thin flange, a portion of said thin flange on said serrated side of said flange adapted to be doubled back against the remaining portion of said flange whereby said serrations engage and lock against each other, a plurality of openings positioned through said body member below said flange and in the area thereof shielded by sidewardly and upwardly offset portion of said thin flange when the same is folded downwardly, said body member having a pair of spaced, downwardly depending flanges at its lower edge extending longitudinally thereof.

2. A ventilator for use with an automobile body having a movable window therein slidable upwardly into a downturned channel, said ventilator comprising a longitudinally extending body member having a bifurcated lower edge defining spaced downwardly extending longitudinal flanges, said body member having a plurality of longitudinally spaced openings therethrough, the upper portion of said body member comprising a relatively tall thin flange having an offset end portion, said flange being grooved longitudinally to define a hinge section, sharp edged longitudinally extending serrations formed on both sides of said thin flange and part of said flange being doubled back on said hinge section whereby said serrations on the side opposite said groove engage and interlock with each other and whereby said offset portion forms an outwardly and downwardly extending flange overlying said openings in spaced shielding relation thereto.

References Cited in the file of this patent

UNITED STATES PATENTS

| | | |
|---|---|---|
| 1,660,893 | Smith | Feb. 28, 1928 |
| 1,785,891 | Danat | Dec. 23, 1930 |
| 1,967,504 | Gaughran et al. | July 24, 1934 |